United States Patent [19]
Jennings

[11] Patent Number: 4,911,307
[45] Date of Patent: Mar. 27, 1990

[54] PHOTOELECTRIC APPARATUS FOR SORTING ARTICLES ACCORDING TO SIZE

[75] Inventor: Frederick R. Jennings, Sebastopol, Calif.

[73] Assignee: Accupack Systems, Exeter, Calif.

[21] Appl. No.: 171,192

[22] Filed: Feb. 23, 1988

Related U.S. Application Data

[63] Continuation of Ser. No. 36,213, Apr. 9, 1987, abandoned, which is a continuation of Ser. No. 753,028, Jul. 8, 1985, abandoned, which is a continuation of Ser. No. 537,949, Sep. 30, 1983, abandoned.

[51] Int. Cl.⁴ .......................... B07C 5/10; G01B 11/10
[52] U.S. Cl. .................................... 209/586; 209/585; 356/385
[58] Field of Search ................ 350/452; 209/586, 585; 356/385, 386, 387

[56] References Cited

U.S. PATENT DOCUMENTS

| | | | |
|---|---|---|---|
| 3,009,571 | 11/1961 | Roberts, Jr. ..................... | 209/585 X |
| 3,566,135 | 2/1971 | Mouchart ....................... | 209/586 X |
| 3,604,940 | 9/1971 | Matthews ............................ | 356/386 |
| 3,743,428 | 7/1973 | Brown ................................. | 356/387 |
| 4,007,992 | 2/1977 | Petrohilos et al. .................. | 456/387 |
| 4,217,053 | 8/1980 | Lavanchy et al. ............... | 356/387 X |
| 4,294,545 | 10/1981 | Stutz ................................... | 356/386 |
| 4,369,886 | 1/1983 | Lane et al. ........................ | 209/582 X |

FOREIGN PATENT DOCUMENTS 57-160006 10/1982 Japan ................................... 356/387

Primary Examiner—Dennis H. Pedder
Assistant Examiner—Edward M. Wacyra
Attorney, Agent, or Firm—Rosenblum, Parish & Bacigalupi

[57] ABSTRACT

A machine for measuring the size of objects that are in motion in single file includes in one embodiment a collimated light beam that as a narrow horizontal width and a long vertical width. The light beam is pulsed ON and OFF at a 10 kilohertz rate but with the light being turned on only 30 percent of the time. The maximum shadow is cast by the maximum height of the object, and causes a minimum oputput voltage amplitude from a photodetector. This minimum output voltage is compared with a reference voltage to determine the object size. A direct digital readout may be obtained. Also, the size information may be passed to a microprocessor or similar device for use in sorting operations. In another embodiment a pair of collimated light beams are positioned about an aperture such that the beams are othogonal. An object passing through the aperture causes a loss of light to each photodetector. The voltage output of each photodetector is combined and averaged. The peak value of the average is used to determine the object size.

2 Claims, 10 Drawing Sheets

PHOTOELECTRIC APPARATUS FOR SORTING ARTICLES ACCORDING TO SIZE

This application is a continuation of my co-pending application Ser. No. 036,213 filed Apr. 9, 1987 (now abandoned); which is a continuation of Ser. No. 753,028 filed July 8, 1985 (now abandoned); which is a continuation of Ser. No. 537,949 filed Sept. 30, 1983 (now abandoned).

BACKGROUND OF THE INVENTION

1. Field of the Invention

This invention relates to a machine for sorting goods that are classifiable according to size, such as fruits, and in particular to the high speed size sorting of such goods.

2. Description of the Prior Art

Photoelectric sorting machines have generally been designed to include a plurality of sorting heads, each head being provided with at least one horizontal and one vertical photoelectric sensor. Each sorting head operates on a different threshold level so as to detect articles of various sizes. Because of this, each sorting head requires its own associated circuitry, and a multiplicity of sorting heads and circuits is a major cost factor.

Another technique for machine sorting is disclosed in U.S. Pat. No. 3,142,383, issued July 28, 1964, entitled "Machine for Sorting", by J. J. Boyer, which concerns a sorting machine wherein the light beam is constituted of parallel rays. A light source is positioned at the focal point of a parabolic mirror (reflector) and a shield is employed so that only reflected light is transmitted across the path of the object to be sorted. A diaphragm is set at an aperture to permit passage of a beam whose cross-section is slightly greater than the orthogonal projection of the larger object to be sorted. The beam received on the other side of the path is concentrated by an identical parobolic mirror. Also, a shield and diaphragm are employed as were used on the transmitting side of the object path. A photoelectric cell is employed to convert the light rays into electrical current. The current produced by the cell is used to control electromagnetic valves which eject the selected article onto an alternate pathway. It is apparent from the forgoing that a plurality of such stations must be positioned along the object path, and each separate light station set to select a particular size object for sorting purposes.

In another technique used for machine sorting, as disclosed in U.S. Pat. No. 4,120,403, issued Oct. 17, 1978, "Photoelectric Apparatus for Sorting Variegated Articles According to Size", by Stephen P. Stephanos, only one station is used to make a measurement. In this case a plurality of photocells are situated on one side of an object conveyer and on the opposite side is placed a column light source. The passage of an object through the light path from the light source will interrupt a number of photocells. The number of photocells interrupted is a measure of the object size.

SUMMARY OF THE PRESENT INVENTION

It is an object of the invention to measure the size of articles, such as fruits, at high rates of speed.

It is a further object of the invention to provide a sorting head at only one location to obtain the measurement information.

It is yet another object of the invention to provide a collimated uniform light beam through which the objects to be measured pass.

It is another object of the invention to use for the measurement the percent of light blocked by the passage of an object through the collimated light beam.

It is still a further object of the invention to use a pulse sampling technique which allows for a higher light intensity during the time when the light is turned on, and which permits correlation of the light and dark times, thereby permitting the elimination of the effects of extraneous light from whatever source; and provides means for correcting for drifts and bias errors in the electronic circuitry.

Briefly, a machine for sizing objects such as fruit, that are in motion in a single file spaced apart relationship along a path, which includes optical means for providing a collimated light beam across said path so as to be in position to be intercepted by the objects in motion along the path. A sensing means monitors the variations in light flux occurring in the beam and provides an electrical output which is linearly related to the light flux present both during the absence of or the presence of an object in said light beam. An object detecting means, designed to convert the electrical output derived from the light intensity obtained from said sensing means, provides both a reference voltage related to the maximum light intensity, and a sense voltage which is related to the size of the object. The reference voltage and the sense voltage are then compared to obtain a size evaluation of the object.

IN THE DRAWING

DETAILED DESCRIPTION OF THE PREFERRED EMBODIMENTS

Figure 1:
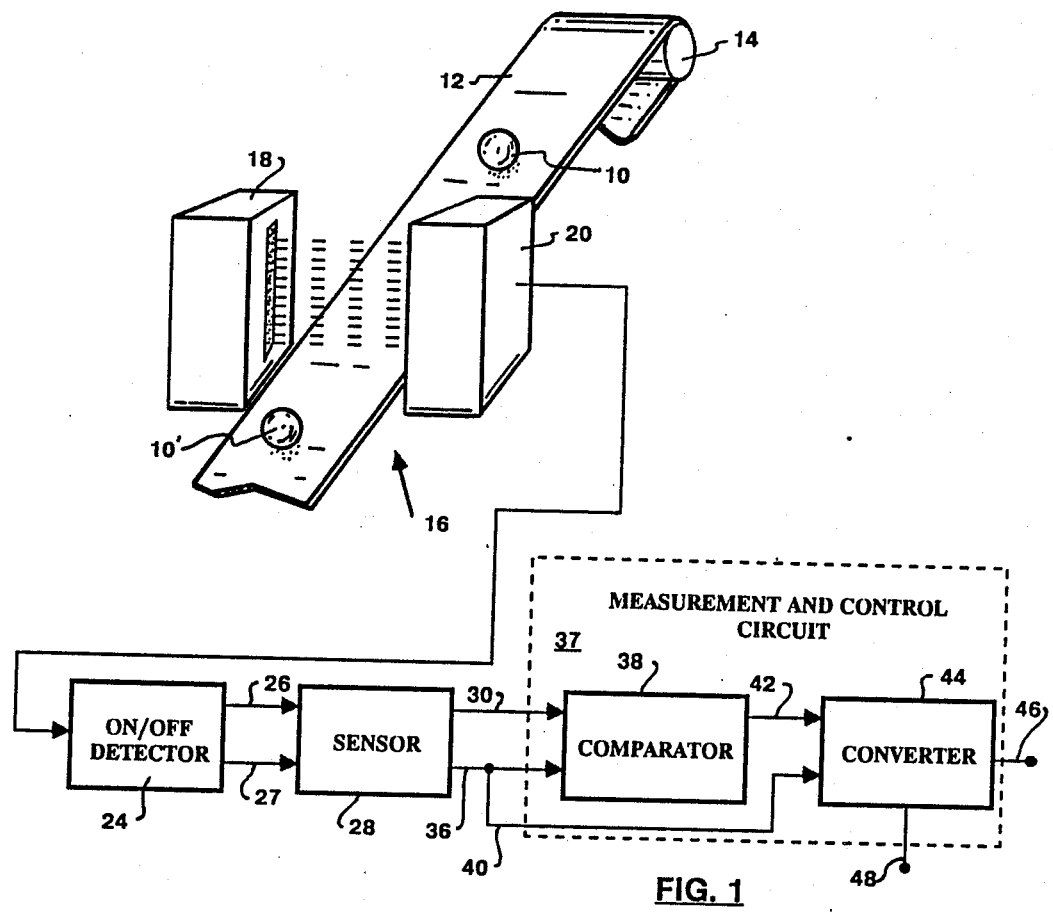
FIG. 1 is a partially broken perspective view of a sorting machine and includes a simplified block diagram illustrating the basic features of the instant invention.

Referring now to the generalized schematic drawing of FIG. 1 along with the accompanying description, the general concept of the invention may be understood. The articles or objects to be measured are designated by a base number 10. Because it would be expected that each article would be of a different size and shape, the use of the prime is employed so as to distinguish separate objects. As shown, these objects are transported in single file on a device such as conveyer belt 12 which is a part of an endless belt, which is only partially shown. A more complete illustration not being considered necessary as endless belts including a drive such as is illustrated at 14 are well known. It is to be understood that in keeping with the normal sorting procedures, once the objects have been sized, they would be shuttled into an appropriate bin or other holding device.

An optical system 16 comprises a light source 18 located adjacent one edge of conveyer 12 and at right angles thereto, the lower end being substantially in the plane of conveyer 12. Light source 18, as will be described hereinafter, provides a collimated narrow width beam of high intensity light comprising uniform parallel rays, which are projected across the path of the object, as established by conveyer 12. As will be explained in more detail hereinafter, the light source is pulsed on and off at a rapid rate to provide light and dark periods.

Light sensor 20 responds to the total light flux, during the light periods, and the electrical signal output is inversely proportional to the shading caused by the object. Because the objects will generally be irregularly shaped, the shading and hence the amplitude of the electrical signal will vary as the object passes through the beam. As a result, a pulse amplitude modulated signal is applied to the input of detector 24.

Detector 24 includes a pair of switches which are separately enabled so as to correspond with the center of said light and dark periods. Thus, detector 24 is responsive to the light source on and light source off conditions i.e., light and dark. By the use of separate switches, detector 24 provides at separate output ports signals which represent the light flux present during the light source on and light source off conditions, respectively. Because of the pulsed nature of the input signal, the detector 24 also integrates the pulses so as to provide a pseudo analog signal. It will be understood that the light on condition will provide a constant maximum signal amplitude, when no object is present to interrupt the light beam. The light on condition will provide a time varying signal output when an object passes through the light beam. The light on signal will be at a minimum amplitude when the largest diameter portion of the object intercepts (blocks) a portion of the light beam.

Object detector 28 converts the light on maximum signal amplitude into a reference voltage that is proportional to the full flux light condition, i.e., a condition when no object shades or interrupts the light beam. Object detector 28 also develops a sense voltage that is proportional to the maximum height of the object which passes through the light beam and provides a signal representative thereof on path 32.

In measurement and control circuit 37, the reference voltage and sense voltages are compared to provide a comparator output voltage on path 42 that is an electrical measure of the height of the object. Converter 44 accepts the output 42 and changes this output into a size readout signal that is present on path 46. Converter 44 also produces a control signal which is available on path 48 and is transmitted along said path to a sorting controller (not shown) whereby the objects may be directed to appropriate bins or storage areas.

Features of the optical system may be better understood by reference to FIGS. 2, 3, 4, 5, 6, 7, 8, and 9, 10 and 10A, in conjunction with the following discussion.

Figure 2:
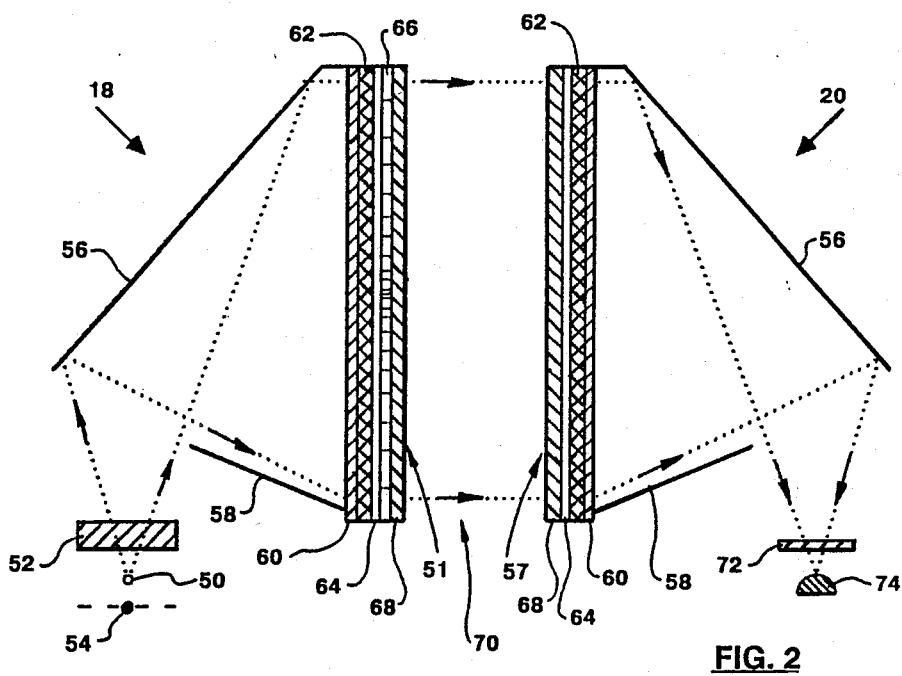
FIG. 2 is a simplified diagram illustrating the optical features of the light source (18) and light sensor (20)

Referring now to FIG. 2, optical system 16 may be seen in more detail and it should be understood that the physical size of the system is dependent upon the size of the object to be measured. For a one axis system, only the height of the object would be measured. Correction of the beam pattern and light density errors are essential to accurate measurement, because the measurement made will compare the total light being received, by the light sensor 20 during passage of an object to the light received when no object is present. If the distribution of light in the beam is not uniform, the measurements will be nonlinear. Although, uniformity of the beam is important it is not an overly critical factor. In empirical testing with a test model it was found that overall accuracy was much better than would be expected based upon beam uniformity alone. It appears that the measurement accuracy is actually a square root function of the light density variation, and the most accurate measurements will occur when the objects being measured have a height which is about ⅓ of the height of the beam. Thus, for an object having a maximum dimension of two to three inches, a beam height of from 8 to 9 inches would be appropriate.

In actual tests, the results, using an under corrected light beam which had a center to edge variation of 1.2:1 (or 20%), show worst case measurement errors of approximately 5% in the 2" to 5" size range.

The width of the beam is not particularly critical but should be selected to provide an accurate measure of the maximum height of the object. However, the beam width should not be so narrow as to be adversely affected by localized variations in the surface of the object. This could result in an incorrect classification of the fruit or other object being measured. But it should be understood that a narrow beam allows for a minimum separation between object, i.e., closer center-to-center spacing. This directly affects the rate at which objects may be measured. Also, the narrower the beam the more accurate will be the profile measurement.

To satisfy these general requirements, an optical system was designed to provide a collimated beam of light 0.2 inches wide by 8 inches high and, as will be understood, the light beam is to have a flux per unit length which is quite uniform. It is clear that the elements shown in the FIGS. 2-9 are not to scale, however, for those having ordinary skill in the art, the optical relationships should be easily understood, and could be implemented without undue experimentation.

Figure 4:
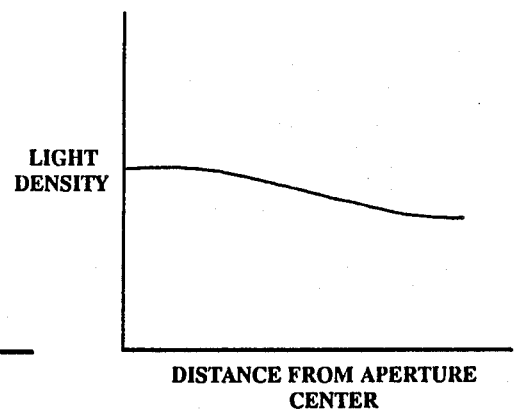
FIG. 4 is a graph illustrating the overall light enhancement characteristic and the selective light enhancement characteristic of a cylindrical lens in which the light source is located inside the focal point of the cylindrical lens.
Figure 5A:
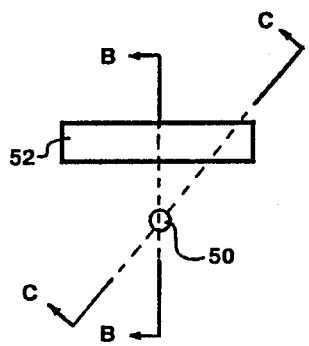
FIG. 5A is an elevation view of a cylindrical lens.
Figure 5B:
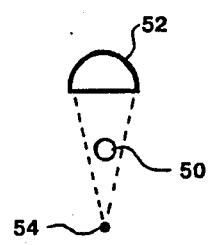
FIG. 5B is a cross-section along the line B—B of FIG. 5A.
Figure 5C:
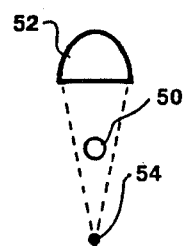
FIG. 5C is a cross-section along the line C—C of FIG. 5A.
Figure 6:
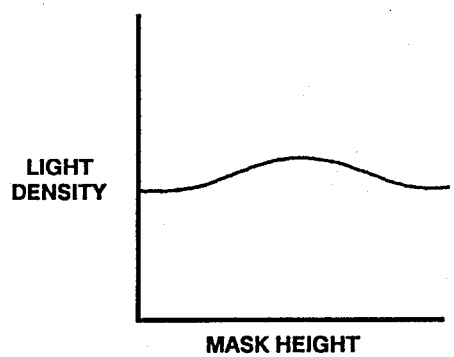
FIG. 6 is a graph illustrating the uncorrected light flux distribution of said light source (18)

Referring again to FIG. 2, light source 50 is mounted below a cylindrical lens 52 that has its longitudinal axis substantially at right angles to the collimating lens assembly 51. The lens face of cylindrical lens 52 is in the plane of the bottom edge of the lens assembly 51. The cylindrical lens is used for two reasons. First, the cylindrical lens provides light enhancement, and second, where the light source is positioned inside of the focal point 54 as shown in FIGS. 2 and 4, the light pattern is made more uniform.

Figure 3:
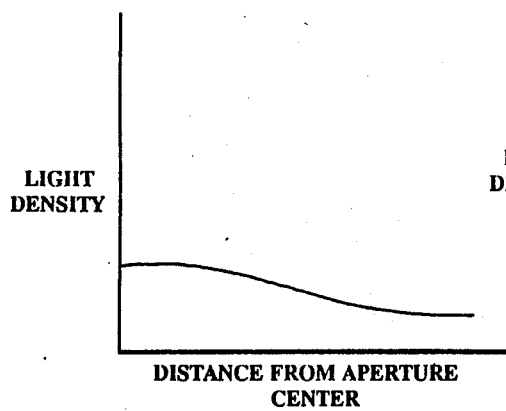
FIG. 3 is a graph illustrating the gaussian flux distribution of a light source.

The normal light pattern from a source is shown in FIG. 3. Such light patterns are, as shown, in the form of a gaussian distribution. Thus, the normal intensity pattern from a light source, at a given distance from the source, is much brighter in the center of the pattern than near the edges. The origin of this unequal distribution is related to the geometry involved. If the beam is being projected through an aperture or a simple lens, the opening of the lens will appear as an ellipse when viewed from any angle other than the optical axis or center line of the projected beam. Thus, the effective area of the lens is different for different angles and the light intensity diminishes as the cosine of the angle. In addition, if the light is being projected on a flat surface, it will be much closer to the source at the center of the beam than at the edges, so the light is further reduced by the square of the ratio of the two distances. In short path systems with wide dispersion angles, the light intensity variation from center to beam edge is very large.

In one embodiment of the invention, it is desired to generate a line of light (a collimated beam) 0.2 inches wide by 8 inches high, and the object is to have the light flux per unit of length as nearly uniform as possible. Thus, the normal gaussian light flux distribution is not acceptable.

Referring to FIG. 3, it may be seen that without the use of a cylindrical lens, the light distribution will be very non-uniform. In contrast, the use of a cylindrical lens in the beam provides the light pattern characteristics illustrated in FIG. 4. Note that by use of the cylindrical lens, the concentration of light is increased thus increasing the overall brightness with respect to the light pattern shown in FIG. 3. By using the cylindrical lens and placing the light source inside of the normal focal line of that lens, the beam will be more in focus at the ends than in the center, which modifies the light pattern so as to reduce the difference in light intensity at the center of the beam from that at the ends. This effect is illustrated mechanically by the generalized cylindrical lens diagram of FIGS. 5A and the sectional diagrams shown in FIG. 5B and 5C Note that the eliptical lens form of FIG. 5C has a shorter focal length than the circular form of FIG. 5B, and the distance from source 50 to the optical center is greater for 5C than it is for 5B. Thus, light rays from 5C are nearly collimated, whereas those from 5B are under corrected, and are spreadout at a substantially greater angle.

Reverting back to FIG. 2, it may be seen that the elongated beam projected from the cylindrical lens is reflected from mirror 56 which is angled to reflect the elongated beam to the backside of the collimating lense array 51. A light shield 58 is positioned to prevent light from source 50 from striking the back side of lens array 51 except by reflection from mirror 56. The reflected light rays strike the back side of array 51 at an angle which approximates a right angle. A slotted mask 60 is the part of this lens array which is first encountered by the reflected light rays and this slotted lens mask 60 sets the beam width and height. A fresnel lens section 62 is positioned adjacent to the slotted mask 60 for minimizing any spurious light transmissions. Because spacing between the mask and backside of the lens can admit spurious light, it is recommended that the slotted mask be formed by painting, such as by use of a spray paint, on the back of the lens. The lens array 51 also includes baffle or separator 64, light flux density correction filter 66 and glass protective cover 68. Because of its unique character flux density correction filter will be discussed in more detail hereinbelow.

For the lens, a fresnel lens is used and may be formed in plastic. The manner of deriving the fresnel lens section is shown is FIG. 10 and 10A. The fresnel lens section 62 is cut from the center of a plastic fresnel lens 63. The lens section 62 contains the optical center 65 of the fresnel lens 63 as shown. The effect of the fresnel lens section 62 is to collimate the light reflected from mirror 56 into a beam of parallel rays having a 0.2 inch width and a 8 inch height. An additional advantage is obtained by use of a light source such as an infared light emitting (IR LED), which limits the adverse effects of normal ambient light sources. This occurs because of the monochromatic light source and the wave length that is not normal in ambient light conditions. Also it is important to select a small size light source, and one that was used successfully had a dimension of $0.01 \times 0.01$ inch. In this case, the light is substantially monochromatic and the light source, because of its very small size, is effectively a point source of light. The collimation resulting from this combination of elements is nearly perfect; and the beam can be projected over a considerable distance with little or no spreading.

As was noted with respect to FIG. 4, the beam intensity even from the cylindrical lens was not uniform. It should also be understood that any lens is subject to light loss due to light being reflected from its surfaces at the air to lens interfaces, and these losses increase as the ray angle of incidence increases. In a system such as this, where short focal lengths and wide beams are involved, there is an increased loss of several percent at the beam ends at each air-glass interface. In addition, the photosensor does not exhibit a uniform characteristic because of angular sensitivity. All of these factors increase the loss of light at the beam ends so as to shift light distribution back toward being more gaussian in character.

Figure 7:
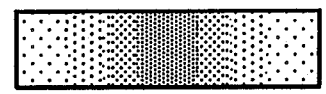
FIG. 7 is a plan view of a photographic film strip (66) in which the density is greater near the center and less at the ends so as to change the light transmission characteristic to that shown in FIG. 8.
Figure 8:
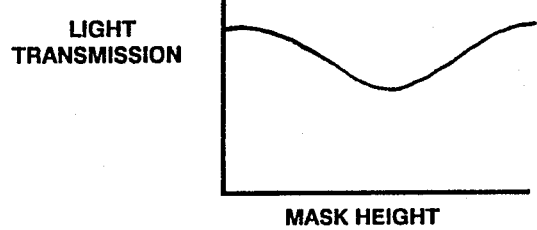
FIG. 8 is a graph of the light transmission characteristic of the photographic film strip (66) of FIG. 7.
Figure 9:
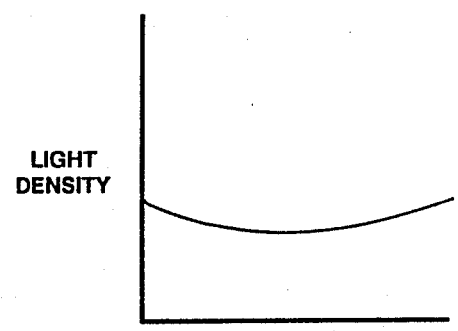
FIG. 9 illustrates the overcorrection of the light flux distribution, at the output of the collimating lens array, caused by the use of film strip (66) so as to correct for the additional light flux distribution non-linearities expected in the receiving lens assembly including filter (72) and photo-sensor (74)
Figure 10:
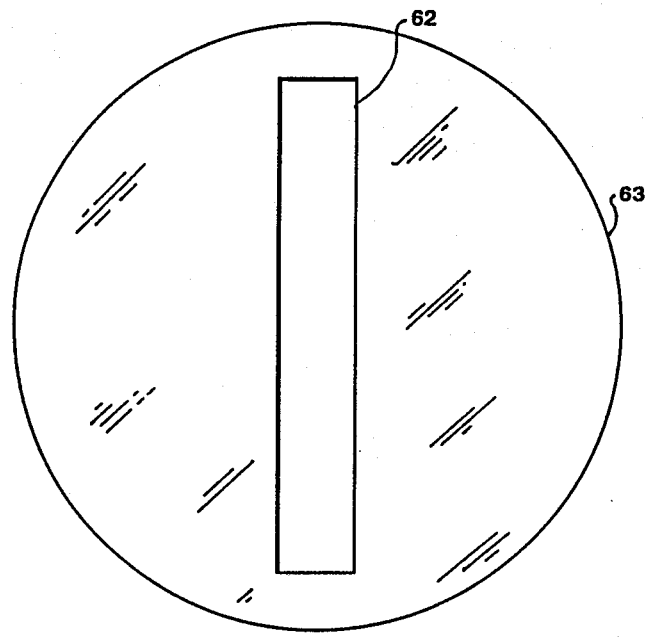
FIG. 10 is a plan view representative of a fresnel lens (63) and illustrates how a fresnel lens section (62) is cut therefrom so as to retain the optical center (65) in the section.
Figure 10A:
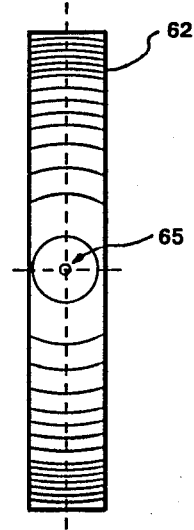
FIG. 10A is a plan view of a fresnel lens section (62) which shows the retained optical center (65)

In order to provide overall light pattern uniformity, further correction of the light density pattern is required. Such a correction can be obtained by overcorrecting the beam intensity with a light flux correction filter 66. What is needed is a filter which has a higher density in the center portion with a gradual reduction of density toward the ends. Such a filter may be devised by the use of a dot matrix screen in conjunction with a photo reduction process which may be used to produce the filter on photographic film. Such photo techniques are well known. Here the variation is obtained by varying the size of the dots, and/or spacing in the matrix. Such a filter is shown at FIG. 7 where the dots present in an area illustrates the dot density density which increases in the center portion. Because of the need to correct the light flux distribution for the over all system, the filter pattern employed provides an overcorrection. The filter characteristic alone is shown by the filter curve in FIG. 8. Intentional overcorrection is needed to compensate for the additional light transmission factors to be encountered during subsequent transmission. The overcorrected characteristic for the light source 18 is illustrated graphically in FIG. 9.

A clear glass protector 68 completes the lens projection assembly by providing mechanical support as well as protection against dust, dirt and objects striking the collimating lens array 51. A stray light shield 58 is positioned to prevent incident light from any source, including light element 50, from striking the back of fresnel lens 62. The light shield is positioned in relation to cylindrical lens 52 and mirror 56 so that only the reflected light from mirror 56 strikes the back of collimating lens array 51.

The light sensor 20 includes a lens assembly 57 which has a cover glass 68, separator 64, fresnel lens 62 and slotted lens mask 60. Each of these elements are substantially the same as those employed in the collimating lens array 51. The parallel light rays from the beam 70 will strike the front surface of fresnel lens 62 and be redirected by means of a converging path through slotted lens mask 60 to mirror 56. From the mirror the rays are reflected to a point of convergence at the position of the photodetecting device 74. Again, to avoid the effects of stray light, a light filter 72 is employed which has the characteristic of passing the desired light rays and substantially rejecting those at other frequencies.

Figure 11:
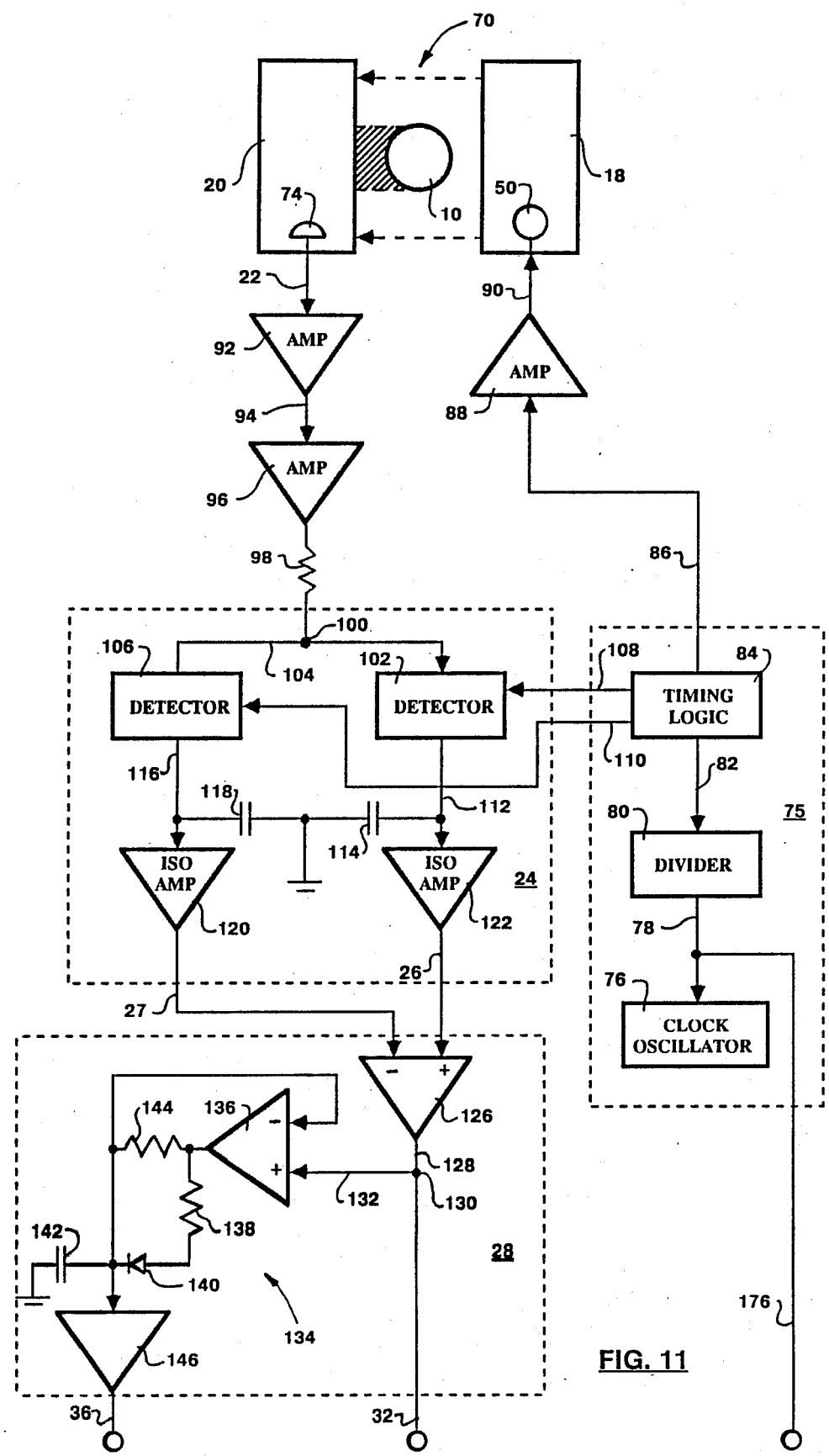
FIGS. 11 and 11A is a schematic drawing which illustrates the light element pulse circuit as well as additional details of the features of phase detector (24), object detector (28), and measuring and control circuit (37) in a preferred embodiment of the invention.
Figure 11A:
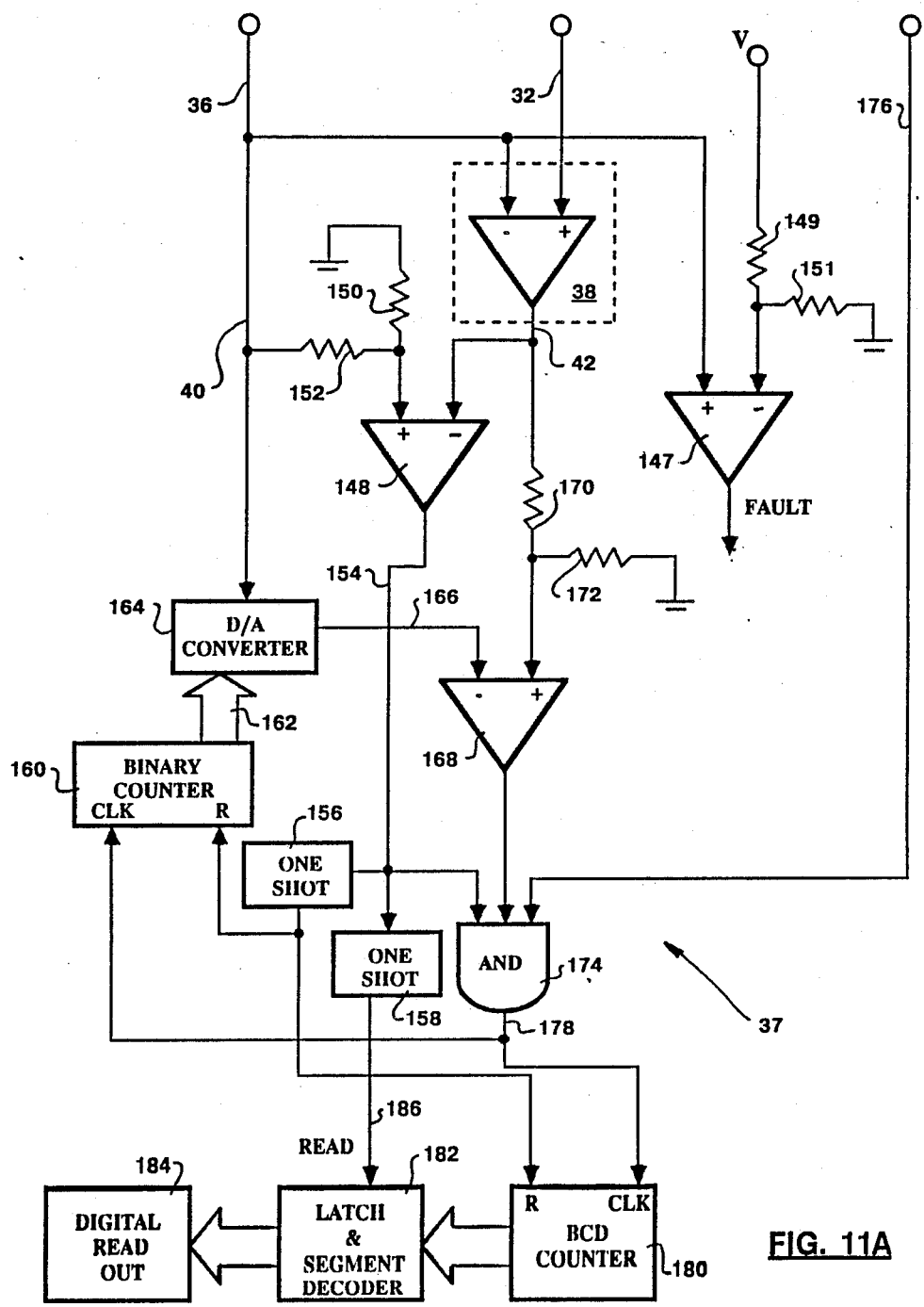

Referring now to FIGS. 11 and 11A, operation of an optical sorting device which employs the teaching of the instant invention may be seen in more detail. It is to be noted that in the preferred embodiment, light element 50 is an infrared light emitting diode having a very small size (0.01×0.01 inch) which for all practical purposes is a point source of light. Further, the light element 50 is pulsed at a 10 kilohertz rate with a duty cycle of 30%, i.e., the light is in the on condition only 30% of the time. Thus, in 10 units of time, the light is on for 3 units of time and off for 7 units of time.

The pulsing of the light element 50 is accomplished by the timing circuit 75 in which clock oscillator 76 generates a frequency of 200 kilohertz which is applied via path 78 to divider 80 where it is divided in half to provide a 100 kilohertz clock signal on path 82 to timing logic 84. Timing logic 84 derives the timing signals by first dividing the clock input signal from divider 80 by 10 to obtain the desired 10 kilohertz signals. In a test model the timing logic comprised a five stage Johnson counter to provide the timed outputs. Three of the five output signals of the Johnson counter are used in various combinations to generate the timing signals used in this invention. All timing signals have a pulse repetition rate of 10 kilohertz. This means that the light elements 50 is ON for 30 microseconds out of 100 microseconds thus, providing light and dark periods which are independent of the passage of an object through the light beam 70. The light driver amplifier 88 may be a simple current limiting transistor switch circuit which converts the high impedance, low current timing signal from timing logic 84 into a 0.5 ampere pulse to drive the light element 50. Of course, other techniques may be used. For example, it is possible to use a current source driver and/or to use feedback which is supplied from the receiver as a means of light source AGC control to enhance the long term stability.

As described hereinabove, the pulsed light from light element 50 passes through a cylindrical lens 52, in a preferred embodiment of the invention, to enhance the light intensity and to improve the light pattern. This light is than reflected from a mirror 56 through a lens assembly 51 which collimates the light rays making a horizontal parallel beam across the path of the object. While a conveyer belt was illustrated in FIG. 1 as a means by which the objects to be measured may be carried through the light path, it should be understood that other techniques may be used. In fact with some light sensing arrangements other techniques may be preferred, one of which will be discussed hereinafter. The pulsed light beam is accepted by the received lens assembly 57 where the parallel rays are bent into a converging pattern and directed to mirror 56. The reason for reflecting the converging rays is to reduce the size of the optical assembly. The reflected rays converge almost to a single point, about the size of the source, and the concentrated rays pass through filter 72 to photosensor 74. Light shield 58 blocks and diffuses light that gets through the light portion.

In a preferred embodiment of the invention, the photosensor used was a silicon photo voltaic (solar cell) cell and was selected because of a number of properties which such devices possess. For example, such a cell eliminates the need for, and the problems associated with, applying a bias voltage to the cell. Further, its use minimizes the offset voltages that would otherwise be present in other devices. The cell should be operated in a short circuit current mode, because then the output current is substantially a true direct linear function of the total light flux being received. Also in the short circuit current mode the cell is essentially non-saturable. In contrast, if a solar cell is operated in an open circuit or high impedance mode, its internal capacity limits its use to low frequency applications, i.e., below about one kilohertz. Further, it will also exhibit a maximum voltage limitation, or saturation voltage. In addition, the output voltage is a non-linear function of the received light flux and is proportional to the density of light per unit area. This means that it is focus sensitive and a small amount of light focused on a small area can produce a larger voltage than a greater light flux spread over a larger area of sensor. These are important disadvantages which must be understood prior to use of the solar cell in this application. Where the cell is operated in the short circuit mode, i.e., into a low impedance, the RC time constant is considerably lower and the cell can be operated at much higher frequencies. Further, the output current is a linear function of the total light flux received, the cell is not focus sensitive, and it has no saturation limit for normal applications.

The electrical current signal obtained from the solar cell, i.e., photosensor 74, is applied via path 22 to the input of a preamplifier 92, which converts this current signal from the sensor into a differential voltage for transmission via a balanced path 94 to the input of the receiver unit for processing. Path 94 is balanced, not grounded, as is common for the transmission of instrumentation signals. This eliminates ground fault and electromagnetic interference (EMI) errors. It is expected that the sensor units would be mounted remote from the main electronic circuitry. To further minimize the effect of outside interference which may be induced into the transmission line between the preamplifier 94 and receiver 96, which may be a distance of 20 feet or more in length, a shielded pair line is commonly used.

It should be recalled that in a preferred embodiment of the invention, light element 50 is pulsed on and off at a 10 kilohertz rate and has a 30% duty cycle. Thus, there will be electrical voltage pulses on path 94, which appear at the 10 kilohertz rate. The voltage amplitude of the electrical pulses will vary depending upon the presence or absence of an object in the light path; and where an object is present, the voltage will vary as a function of the size of the object. The voltage being smaller for larger size objects.

Figure 12:
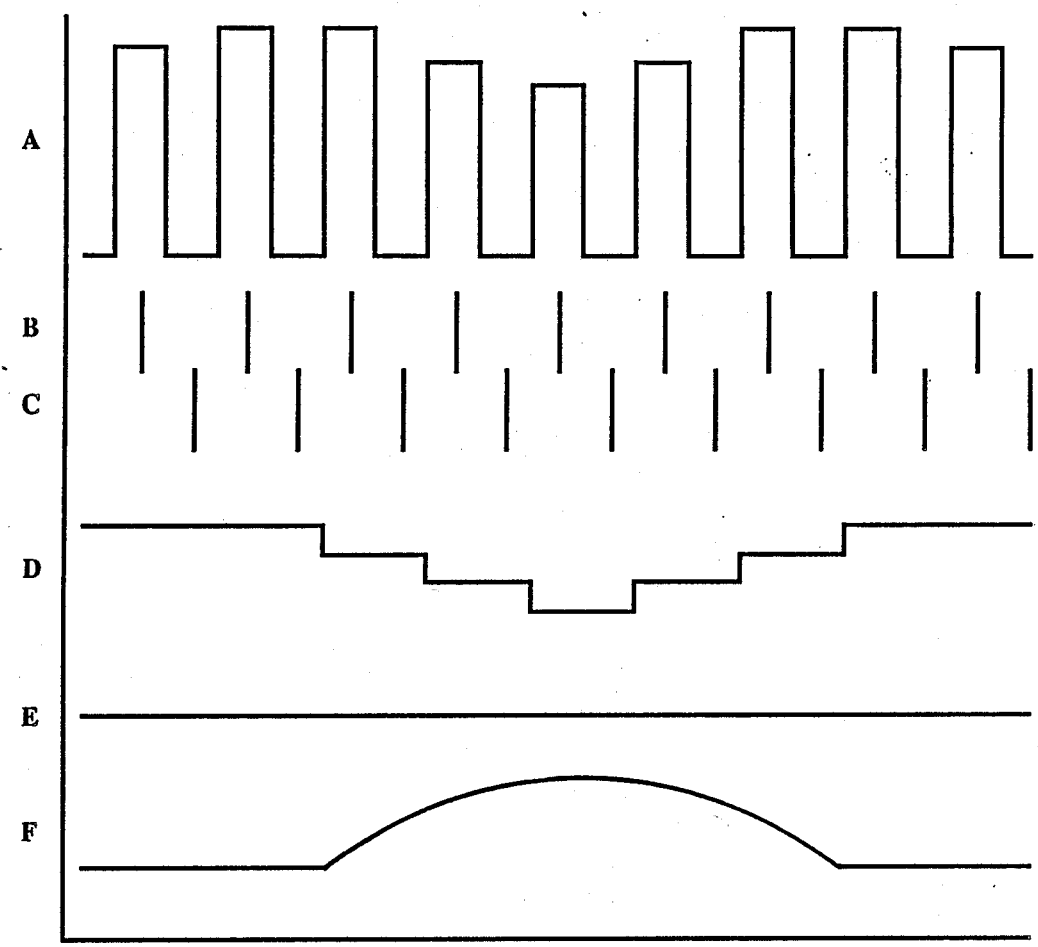
FIG. 12 is a waveform diagram illustrating the effects of the pulsed light on the electrical signals derived therefrom at different points in the circuit of FIGS. 11 and 11A.

Waveforms which illustrate these characteristics are shown in FIG. 12. Waveform A is representative of a pulse amplitude modulated signal that would appear at the output of amplifier 96 as an object passes through the light beams. As may be seen from the waveform diagram, the voltage representing the sensed light amplitude is a pulse amplitude modulated signal consisting of a plurality of equally spaced unipolar pulses. The separation between pulses would be longer than that shown where the duty cycle is 30% for the light on condition. Thus, the waveform diagram is not to scale. The function of the receive amplifier 96 is to convert the differential sensed voltage amplitudes into a series of unipolar pulses referenced to the ground. The output of receive amplifier 96 is applied to the input of phase detector 24 via resistor 98. In conjunction with capacitors 114 and 118, resistor 98 forms RC smoothing filters to integrate the pulse output from amplifier 96. Also, resistor 98 provides short circuit (capacitive) current limit protection for amplifier 96.

On/off detector 24 includes two detectors 102 and 106 each of which may be in the form of an electronic switch. A pair of CMOS switches were used successfully. The output voltage from amplifier 96 is applied via resistor 98 directly to the input of detector 102 and via junction 100 and path 104 to the input of detector 106. Each phase detector passes only that information applied to its input during the time the detector is enabled. The enabling inputs to strobe the respective detectors are obtained from the timing logic circuit 84 and are applied to the enabling inputs, respectively, of detectors 102 and 106 via path 108 and 110. The phase of the strobe pulses are shown as waveforms B and C. Although not to scale, it should be noted that the strobe pulses B and C are quite narrow and appear either at the center of the light pulse or the center of the dark period.

In a preferred embodiment of the invention, the strobe pulses had a duty cycle of 10% and were timed to appear in the centers as noted hereinabove. Thus, for a 100 microsecond signal, the pulse width of strobe pulses B and C would each be 10 microseconds. The timing strobe pulse input which enables detector 102 is phased so as to read the voltage amplitude of the pulsed light that appears at junction 100, during light pulse on conditions, and passes this voltage through on path 112 to capacitor 114. This voltage will increase or decrease the charge on the holding capacitor 114 depending upon the amplitude of the pulse currently appearing on the path 112. Thus, capacitor 114 responds to the voltage amplitude of the unipolar pulse output from receive amplifier 96. Each unipolar pulse amplitude applied to capacitor 114 is directly representative of the amplitude of the light signal sensed by sensor 74 during a light on condition. The pulse amplitude may include the contribution from the light source as well as any ambient light which may have entered the system, plus any DC offset appearing at the output of amplifier 96.

Detector 106 accepts the same input signal as detector 102 but is enabled to pass only that current applied to its input during the time when the light element is dark, i.e., the light off condition. The output of detector 106 is applied via path 116 to capacitor 118 which stores an electrical signal that is representative of the ambient light condition in the monitoring system, plus any DC offset appearing at the output of amplifier 96. The RC time constants for both capacitors 114 and 118 are sufficiently short so that the stored voltages on the capacitors can change to track rapid changes in the input signal voltage. Thus, the voltages on capacitors 114 and 118 represent the light being received respectively, from the light source plus the ambient and DC voltage offsets or the ambient light and DC voltage offset alone.

In order to eliminate unwanted current drains which would otherwise tend to discharge the capacitors and degrade the signal tracking accuracy, capacitors 114 and 118 are buffered by isolation amplifiers 120 and 122, respectively. The isolation amplifier outputs are, as shown in FIG. 1, applied via paths 26 and 27, respectively, to the non-inverting and inverting inputs of differential amplifier 126. In effect, the two capacitor voltages are algebracially subtracted by the differential amplifier 126 so that the ambient light and DC offset component of the signal are cancelled out leaving only the desired signal from the sensor unit light source. Note that because this has the effect of removing any D-C off-set that may be present in the signal the need for an off-set null circuit is eliminated.

Referring to FIG. 12, it should be noted that an additional effect of the capacitors 114 and 118 is to convert the unipolar waveform A into a time varying waveform such as shown at D in FIG. 11. The waveform E is shown as a horizontal line because of the absence of ambient light as would be expected in systems which make use of this invention.

The light signal output on path 128 is applied directly as one input to comparator 38 and via junction 130, path 132 to the input of reference voltage generator 134. The latter includes a peak detecting sample and hold circuit that has a very short charging time (in the milliseconds) and a very long discharge time (in the tens of seconds). As shown in FIG. 11, the voltage input on path 132 is applied via the non-inverting input of differential amplifier 136, the output of which is applied via resistor 138 and diode 140 to one terminal of capacitor 142, the other terminal of capacitor 142 being connected to ground. The resistor 138 has a resistance value of one thousand ohms and is used to control the charging current amplitude when capacitor 142 is at a low or minimum charge condition. Diode 140 prevents discharge of capacitor 142 via resistor 138 and the internal impedance of differential amplifier 136. To obtain a long discharge time, i.e., a long RC time constant, resistor 144 is used and has a magnitude of approximately one megohm. By means of the short charging time and long discharge time (RC time constant), the charge on capacitor 142 continues to build up until it reaches the point where it represents the received light flux, when no object or obstruction is present in the sensor beam 70. Of course, if the sensor beam were to be obstructed for a long time, the charge on the capacitor 142 would drift downward, thus upsetting or destroying the measurement accuracy.

Because this is a dynamic system and the objects being sensed are spaced so that they pass through the sensor one at a time, with a gap between objects, the full light flux comes through during the gaps and keeps the voltage on capacitor 142 refreshed. While it depends somewhat on the size of the object, the anticipated passage of time of the object through the light beam 70 is approximately 0.05 seconds. The result of the presence of the object in the light beam 70 would be expected to cause a change in the reference voltage of no more than one part in ten thousand or about 1/100th of one percent. This degree of error is substantially insignificant. A buffer amplifier 146 is used to isolate the storage capacitor 142 from the comparator 38 and the other portions of the measurement and control circuit 37, FIG. 11A.

By providing a uniform, relatively narrow and high collimated light beam 70, the obstruction of the light beam by an object passing therethrough cast a shadow on the receiving lens. While it may not be readily apparent, the shadow cast by the object represents a percentage of the light flux which is proportional to the size of the object. This is translated by the electrical circuitry described hereinabove so that the result of subtracting the reference signal from the difference signal at the output of the detector 24 provides a precise measure of the size of the object as a percent of the received signal voltage. Further, it does not matter what the absolute values of the compared signal amplitudes are; what is important is the ratio of the output or sensed signal, which represents the size of the object, to the reference voltage.

For example, if the beam is 25 percent obstructed then the signal voltage will be exactly 0.25 times the reference voltage, and this is related to the full height of the beam. To obtain this correctly measured value, it is only necessary to provide the appropriate scale factor at the output of the comparator 38. Resistors 170 and 172 are selected to provide the appropriate scaled electrical input to the non-inverting input of differential amplifier 168. Because of the manner in which the reference voltage on path 36 was compared to the light signal on path 32 in comparator 38, the output on path 32 represents the light present during the time that the obstruction passed through the beam 70.

To convert the light present signal into some readable form, the converter circuity 44 is employed. One example of a technique for converting the electrical signals into a readable form is illustrated in FIG. 11A. The reference signal is applied via path 40 to an input of a digital to analog (DA) converter 164 and through a voltage divider circuit consisting of resistors 150 and 152 to the non-inverting input of differential amplifier 148. The other input to differential amplifier 148 is obtained from the output of comparator 38, path 42. The voltage divider 150, 152 sets the threshold and when the signal applied to the inverting input of differential amplifier 148 is at an appropriate level, the output of differential amplifier 148 will change state, i.e., from binary "0" to binary "1". This condition will appear on path 154 and will remain unchanged so long as the signal amplitude applied to the inverting input of differential amplifier 148 remains above the threshold level. This switch to a binary "1" state provides an enabling input (target pulse via path 154) to AND-gate 174 and triggers one shot multivibrator 156 so that an output reset pulse is applied to the reset inputs of both binary counter 160 and binary coded decimal counter 180. By resetting binary counter 160, the state of the parallel inputs to D/A converter 164 via path 162 is reset. Thus, the initial output voltage on path 166 is low and it is at a level which permits differential amplifier 168 to provide an enabling output to a second input of AND-gate 174. The third output to AND-gate 174 is from the timing circuit 75 via path 176. With AND-gate 174 enabled by the target pulse present on path 154 and the output of differential amplifier 168, the clock timing pulses from path 176 are passed through onto path 178 where they are applied to the clock inputs respectively of binary counter 160 and BCD counter 180. So long as the clock pulses step the binary counter 160, D/A converter 164 will continue to increment the voltage output so as to systematically increase the amplitude of the voltage applied to path 166. This increases the voltage applied to the inverting input of differential amplifier 168, via path 166, and brings the voltage closer to the value of the reference voltage. When the amplitude of the voltage applied to the inverting input of differential amplifier 168 is greater than that applied to non-inverting input the output of differential amplifier 168 will change state. When this occurs, the AND-gate 174 is disabled which stops the clocking of binary counter 160 and three digit BCD counter 180.

When the object has completed its passage through the light beam 70, this fact is recognized by differential amplifier 148 and the output state is changed to binary "0". This change of state triggers one shot multivibrator 158 which is responsive to the trailing edge of the pulse. Triggering multivibrator 158 causes it to provide a pulse output on path 186 which enables the read input of latch and segment decoder 182. This in turn, provides a read signal to digital read out 184. Thus, the relative size of the object is obtained. This sizing information is translated directly into a readable number based upon the percentage of light flux intercepted by the object as it passes through the light beam, as explained hereinabove.

The measurement is a direct function of one demension of the object—scaling into a readout device is accomplished by divider consisting of resistors 170 and 172, where the ratio is the maximum demension (light beam length) divided by the full scale count of a binary counter 160. In this case a ten bit binary number is used so the scale ratio is divided by 1023. Where the beam height is selected to be 8 inches, as is employed in the test device, the ratio of the maximum demension to the binary number is 800/1023 and is equal to resistor 172 divided by the sum of resistors 170 and 172. This results in a readout in inches to two decimal places.

Figure 13:
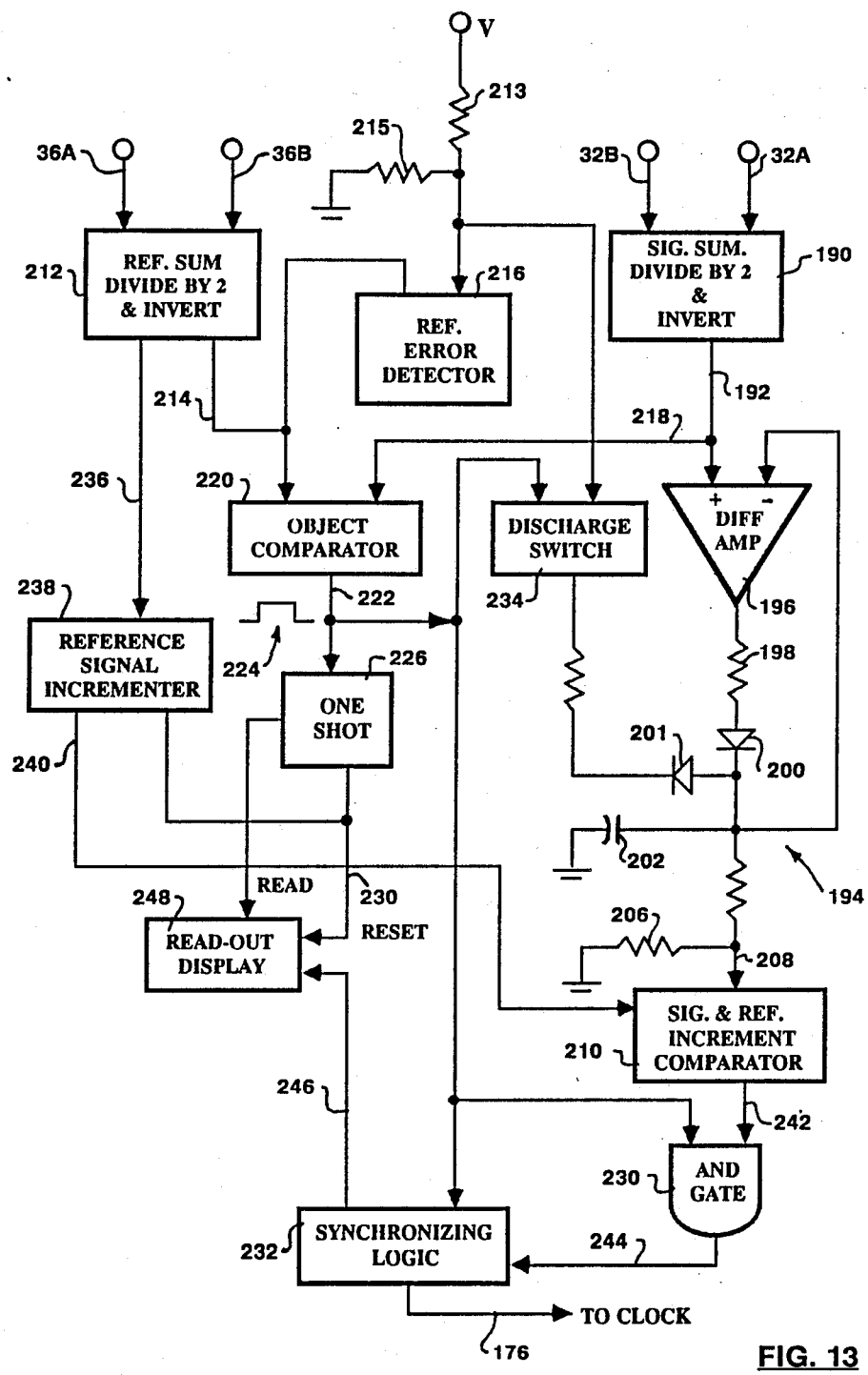
FIG. 13 is a schematic drawing which illustrates features of an alternate detection measuring circuit that may be used where two orthogonally positioned optical systems are used.

For fast moving objects, a peak level signal holding circuit may be required in order to allow a longer time for the conversion counter to count up to the final full magnitude. An example of a peak holding circuit is illustrated in FIG. 13 by the circuit components comprising diodes 200 and 201, capacitor 202 and discharge switch 234. The need of a holding circuit is dictated by the object speed, the clock rate and the D/A output amplifier voltage slew rate. If the converter can operate fast enough to track the signal, a holding circuit is not required. It has been found that by using a clock rate of 200 KHz, the peak holding circuit can be eliminated.

As shown in the block diagram, FIG. 11A, the amplitude of the reference signal can be monitored by a comparator circuit so as to detect when the overall light flux has dropped below some preset limit. This drop in light flux could be caused by a dirty objective lens or light source failure or other adverse condition. The measurements may be either relative such as was described for the object present signal or the measurement may be absolute as shown for the fault signal indication. Here the reference signal from amplifier 146 is applied to the non-inverting input of differential amplifier 147 and a fixed voltage V is applied via voltage divider resistors 149 and 151 to the non-inverting input. The fixed voltage is obtained from the D/C supply source for the system. Should the light flux dip below a predetermined level, a "fault" or alarm indication is transmitted.

It should also be appreciated that if the signals can be converted to a dimensional value for display, they can also be just as easily transferred to a shift register or other type of memory device. By doing so, it is possible to use this information to keep track of the location of the sized items in the transport system. By such use, the directing of an object into a particular bin or box may be readily accomplished.

Figure 14:
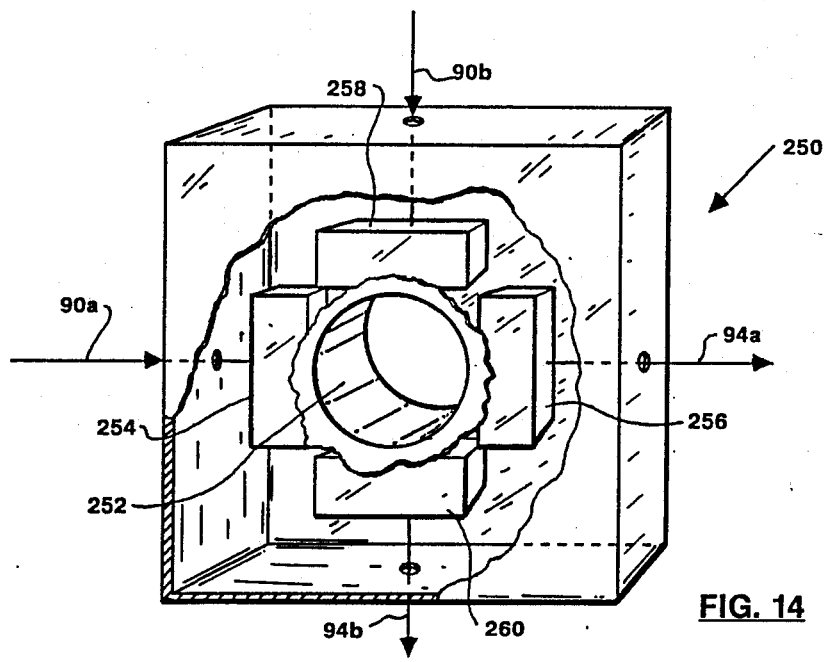
FIG. 14 is a perspective view of the optical portion of a measuring system in which objects pass through an aperture 252 about which a pair of light sources and light sensors are orthogonally placed.
Figure 15:
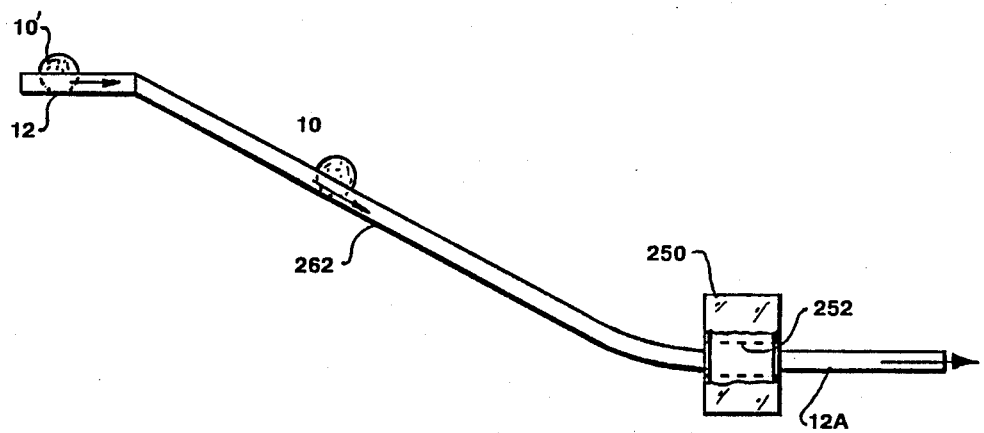
FIG. 15 shows a ramp input to a sensor like the one shown in FIG. 14.

Referring now to FIGS. 13 and 14, it may be seen how two orthogonal collimated light beams may be arranged about an aperture through which an object is to pass. The lens-photosensor assembly 250 is designed to hold a pair of light sources 254 and 258 and their associated light sensors 256 and 260. The sources are arranged to provide horizontal and vertical light beams across aperture 252, and the sensors 256 and 260 are disposed in a diametrically opposed relationship to intercept their respective beams; and the sources and sensors are arranged so that the collimated light beams lie substantially in a common plane. Because of the manner in which measuring the aperture is formed, the use of a conveyor belt is essentially precluded. It is apparent that an inclined ramp as shown in FIG. 15, may be used to give the object sufficient velocity to pass through the aperture. At the far side a conveyor belt 12A could be used to accept the object and move it to a designated storage location.

The electrical connections to the light driving source are illustrated symbolically by the lines designated 90a and 90b. The power arrangements would be as described hereinabove. The light sources each would be pulsed on at different times to smooth the power flow and reduce the power requirements. The light sources would preferably be pulsed on so as to be 180 degree out of phase. Because of the rate at which the switching will occur, no significant adverse affect, will be noted in the measurement.

While an equivalent of the preamplifier 92 is not shown, it is to be understood that one or more would be provided as necessary. For example, an amplifier could be incorporated in the respective light sensing device 256 or 260. As was discussed with respect to FIG. 11, an associated receiver circuit would be used to amplify the unipolar signal from its sensor. Using the phase detection technique described hereinabove, the pulse amplitude of the modulated light signal, absent any ambient or off-set voltage, would be derived. The electrical amplitude of the modulated light signal would then appear, for example, on path 32, FIG. 11. Each of these derivations would be performed separately for each of the two orthogonal light rays, and the sensor signals would appear on input paths 32a and 32b, FIG. 13. Similarly, as disclosed with respect to FIG. 11, a reference voltage would be derived and would be available on a path such as 36 of the circuit associated with the particular photosensor assembly. These would appear on input paths 36a and 36b of FIG. 13.

Referring now to FIG. 13, the signal processing of the separately derived sense and reference voltages may be understood. To establish the relative size of the object, the sense voltages are shown to be separately applied to input paths of 32a and 32b of an averaging circuit 190. Circuit 190 sums the two sensor input signals and divides this sum by two to provide an average sensor voltage at an output connected to path 192. The average voltage is then applied to a peak diameter sensing circuit 194 comprising differential amplifier 196, charging resistor 198, charging diode 200, and peak diameter storage capacitor 202. Resistors 204 and 206 form a voltage divider network that provides the scaling factor for the measuring system. By use of a scale factor, the correct size of the object may be read out on the display 248. The scaled signal is applied to an input of a signal reference and increment comparator 210 via path 208, where the scaled signal is continuously compared to a step sequence of voltage values derived from the reference voltage. A technique for deriving such a step sequence of voltage values was described hereinabove. However, other techniques may be used.

Referring now to the other pair of inputs, the reference voltages are applied via paths 36a and 36b to a reference signal sum, divide by 2 and invert device 212 in which the average reference voltage is derived. The average reference voltage is then applied via path 214 to a reference error detector 216 which compares the average reference voltage to a fixed reference voltage derived from source voltage V and a voltage divider formed of resistors 213 and 215. When the average reference falls below the level established, an error signal indication is provided.

The average reference voltage is also applied via path 214 to one input of object comparator 220. The other input to object comparator 220 is the average sensor voltage. This object comparator 220 operates much as that shown and described for comparator 148 in FIG. 11. When the average sensor voltage is a certain percentage above the average reference voltage, the output of the object comparator 220 is switched to a binary "1" state. This generates a target pulse such as shown at 224 which is supplied via path 222 to an input of one shot 226.

The leading edge of target pulse 224 causes a reset pulse to be put out on path 230 to enable the read out display 248. Pulse 224 is also applied via path 228 to one input of AND-gate 230 and one input of synchronizing logic circuit 232. This enables these two circuits.

The average reference voltage is also applied as an input to the reference signal incrementer 238 which operates very much as described for the binary counter and A/D converter circuit of FIG. 11A so as to provide an incremented voltage (step sequence) on path 240 to the input of increment comparator 210. A sensed voltage having an amplitude greater than the instantaneous value of the stepped voltage sequence on path 240 causes comparator 210 to provide an enabling signal, which is applied via path 242 to a second input of AND-gate 230. Thus, when an object is present, AND-gate 230 will be enabled which will enable synchronizing logic 232 because of the presence of enabling pulse 224 on path 228. The clock pulses on path 176 are then passed through the synchronizing logic 232 to path 246 causing the counter and read out display 248 to begin counting.

The count will continue until the incremented reference voltage applied to comparator 210 via path 240 is greater than the scaled value of the average peak sensed voltage, and then AND-gate 230 will be disabled. With AND-gate 230 disabled, the synchronizing logic is then disabled which removes the clock pulse from the read out display 248, and the counter discontinues the counting function and holds its output.

When object comparator 220 recognizes that an object is not present in the light beam, it changes state. The trailing edge of the pulse triggers one shot 226 to apply a pulse output on read path 232 to the read out display 248 causing the read out display to display the number counted. By appropriate selection of scale factors and associated counters, the number counted will be the measured object size.

The trailing edge of the pulse 224 causes the discharge switch 234 to be momentarily shorted as its output to ground which discharges capacitor 202. This is necessary to make the full peak range of capacitor 202 available for the measurement of the next object.

One technique for providing object motion through lens photo-sensor assembly 250 is illustrated in FIG. 15. Object 10 is on ramp 262 which accelerates the object so that it can pass through the aperture 252 in flight. Thus there is no conveyor track to interrupt the light beam. A part of the normal conveyor system is shown as 12A and is positioned to accept the object after it has passed through apperture 252.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for sizing objects such as fruit so that they may be sorted according to size as they are moved in a single file, spaced relationship along a path, said machine comprising:

first and second optical means positioned on different sides of said path for providing first and second orthogonally directed, collimated light beams extending across said path and positioned to be intercepted by objects as they are moved along said path, at least a portion of each said light flux passing across said path, said first and second optical means each including an optical axis intersecting said path at right angles and having disposed therealong, a generally planar first mask positioned adjacent said path and having an elongated relatively narrow transparent first slot formed therein, the length of said first slot being longer than the cross-sectional dimension of an object to be passed along said path and extending in a direction normal to the direction of said path, said slot being oriented transverse to and intersected by said optical axis, a diametral segment of a first Fresnel lens disposed along said optical axis adjacent and in alignment with said slot, said first Fresnel lens forming a collimator for light emitting from its back focal point, filter means disposed along said optical axis adjacent to and in alignment with said first Fresnel lens and having a light transmission characteristic that increases in a predetermined manner from its center outwardly, an elongated cylindrical lens disposed between said back focal point and said first Fresnel lens with its focal line oriented normal to and passing through said optical axis at a point outside said back focal point, and focal line being oriented in optical parallel relationship to said slot, and a substantially monochromatic illumination means forming a point source of light disposed along said optical axis at said back focal point, whereby light emanating from said point source is passed through said cylindrical lens, said Fresnel lens, said filter means and said first mask and caused thereby to form a collimated light beam of substantially uniform intensity for passage across said path;

first and second sensing means disposed on different sides of said path respectively opposite said first and second optical means being operative to monitor the light flux of said beams passing across said path as said beams are partially blocked by objects passing along said path, and responsive thereto to respectively develop first and second electrical output signals corresponding thereto; and detector means responsive to said first and second output signals and operative to develop sizing signals which may be used to facilitate the sorting of the objects moving along said path.

2. Apparatus as recited in claim 1 wherein said first and second sensing means each include:

photodetector means for developing one of said first and second output signals;

a generally planar second mask positioned adjacent said path and having an elongated, relatively narrow transparent second slot formed therein, the length of said second slot being oriented parallel to a corresponding first mask so as to admit one of said first and second light beams after it has crossed said path; and a diametral segment of a second fresnel lens disposed adjacent said second slot for focusing light passing through said second slot onto said photodetector means.

* * * * *